United States Patent [19]

Ray et al.

[11] Patent Number: 5,574,573
[45] Date of Patent: Nov. 12, 1996

[54] COMPRESSION METHOD FOR A STANDARDIZED IMAGE LIBRARY

[75] Inventors: Lawrence A. Ray; Richard N. Ellson, both of Rochester, N.Y.

[73] Assignee: Eastman Kodak Company, Rochester, N.Y.

[21] Appl. No.: 145,284

[22] Filed: Oct. 29, 1993

[51] Int. Cl.⁶ .......................... H04N 1/387; H04N 1/00; H04N 7/18; G06K 9/00
[52] U.S. Cl. .......................... 358/452; 358/403; 358/447; 358/448; 358/426; 358/453; 382/117; 382/118; 382/201; 348/77; 348/422
[58] Field of Search .................................... 358/403, 166, 358/452, 453, 426, 447, 448, 454, 455, 456, 261.1, 261.2, 261.3; 382/44, 45, 50, 54, 2, 115, 116, 117, 118, 201; 348/77, 422, 429, 649, 652

[56] References Cited

U.S. PATENT DOCUMENTS

| | | | |
|---|---|---|---|
| 4,464,677 | 8/1984 | Kuhn et al. | 358/537 |
| 4,754,487 | 6/1988 | Newmuis | 382/118 |
| 4,811,408 | 3/1989 | Goldman | 382/115 |
| 4,853,778 | 8/1989 | Tanaka | 358/426 |
| 4,922,545 | 5/1990 | Endoh et al. | 358/426 |
| 4,975,969 | 12/1990 | Tal | 382/117 |
| 4,993,068 | 2/1991 | Piosenka et al. | 382/116 |
| 5,067,152 | 11/1991 | Kisor et al. | 348/422 |
| 5,163,094 | 11/1992 | Prokoski et al. | 382/118 |
| 5,259,025 | 11/1993 | Monroe et al. | 382/115 |
| 5,276,511 | 1/1994 | Takemoto | 358/448 |
| 5,295,077 | 3/1994 | Fukuoka | 358/426 |
| 5,432,864 | 7/1995 | Lu et al. | 382/118 |

FOREIGN PATENT DOCUMENTS

| | | | |
|---|---|---|---|
| 2231699 | 11/1990 | United Kingdom | 382/118 |
| WO86/07480 | 12/1986 | WIPO | G06K 19/00 |
| WO92/02000 | 2/1992 | WIPO | G06K 9/46 |

OTHER PUBLICATIONS

Proceedings of the British Machine Vision Conference, Proceedings of BMVC '92. BMVC, Leeds, UK, 22–24 Sep. 1992, ISBN 3–540–19777–X, 1992, Berlin, Germany, Springer–Verlag, Germany, pp. 508–517, RAMSAY C S et al "A Comparison of Vector Quantization Codebook Generation Algorithms Applied to Automatic Face Recognition".
Vol. 017 No. 331 (E–1386) Jun. 23 1993 Publication No. JP–A–05 037901; Feb. 12, 1993 Patent Abstracts of Japan.
Vol. 014 No. 205 (E–0921) Apr. 26, 1990 Publication No. JP–A–02 044881; Feb. 14, 1990 Patent Abstracts of Japan.
Vol. 017 No. 444 (E–1415 Aug. 16, 1993 Publication No. JP–A–05 095541; Apr. 16, 1993 Patent Abstracts of Japan.
Robert Gray, "Vector Quantization", IEEE ASSP Magazine, vol. 1, Apr., 1984, pp. 4–19.
Kirby et al., "Application of the Karhunen—Loeve Procedure for the Classification of Human Faces", IEEE Trans. on Pat. Analysis and Mach. Int., Jan. 1990, pp. 103–108.
Shackelton and Welsh, "Classification of Facial Features for Recognition" Proc. 1991 IEEE Computer Society Conf. Comp. Vision and Pat. Rec., Jun. 1991, pp. 573–579.
Sutherland et al., "Automatic Face Recognition" First Int. Conf. on Intelligent Systems. pp. 29–34 Aug. 21, 1992.
Turk et al. "Face Recognition Using Eigenfaces" Proc. 1991 Comp. Soc. Conf. on Computer Vision and Pat. Recog. pp. 586–591, Jun. 6, 1991.
Sutherland et al., "A Novel Automatic Face Recognition Algorithm Employing Vector Quantization" IEEE Colloq. (1992) No. 017: Machine Storage and Recognition of Faces pp. 1–4.

Primary Examiner—Kim Yen Vu
Assistant Examiner—Kimberly A. Williams
Attorney, Agent, or Firm—Edward Dugas

[57] ABSTRACT

A technique involving the standardization of the subject matter of an image and the compression of the image using features of the standardization can provide for a high compression ratio. This technique can be used to improve the quality of a restored image for a predetermined amount of storage space.

7 Claims, 8 Drawing Sheets

COMPRESSION METHOD FOR A STANDARDIZED IMAGE LIBRARY

FIELD OF INVENTION

The present invention relates to the field of digital image compression and decompression. In particular, the method is customized to be applied to a large library of similar digital images where the variety and location of image features are known in advance.

BACKGROUND OF THE INVENTION

In general, image compression seeks to reduce the storage requirements for an image. Decompression restores the image. Not all compression/decompression processes restore images to their original form. Those which do are called "lossless" methods. In general, lossless methods do not compress images as highly as do lossy methods which change the image and introduce some degradation in image quality. In applications where high-compression ratios are desired, lossy methods are used most frequently.

Images can be compressed as they contain spatial correlation. This correlation implies that differences in neighboring pixel values are small compared to the dynamic range of the image. A basic rule-of-thumb is that more correlation implies a greater potential for higher compression ratios without loss of visual image fidelity. The vast majority of image compression methods have their foundations in broad statistical measures. Some methods are more sophisticated and vary the compression algorithm based upon local statistics (see M. Rabbani and J. P. Jones, "Digital Image Compression Techniques," vol., T77, SPIE Press, Bellingham, Wash., 1991). However, all of these techniques are applied to the entire image as there is no prior knowledge of image features and image position. The statistics account for correlations between neighboring pixels; they do not account for correlations between groups of pixels in corresponding locations of different images.

Compression algorithms have been developed to handle motion sequences of images such as sequential frames of a motion picture (see Bernd Jahne, "Digital Image Processing: Concepts, Algorithms, and Scientific Applications", Springer-Verlag, Berlin, 1991). Images taken close in time have a high degree of correlation between them, and the determination of the differences between the images as the movement of the image segments leads to large compression ratios. This type of image-to-image correlation works well for images which undergo incremental distortions.

Other collections of images have image-to-image correlation, but not to the degree that motion sequences possess and do not compress well with motion algorithms. Consider a library of pictures of missing children. For this collection of images, there will be a large degree of image-to-image correlation based upon pixel location as faces share certain common features. This correlation across different images, just as with the spatial correlation in a given image, can be exploited to improve compression.

Analysis of image libraries yields knowledge of the relative importance of image fidelity based on location in the images. Indeed, maintaining good image fidelity on the face of a child would be more important than fidelity in the hair or shoulders which in turn would be more important than the background. Image compression can be more aggressive in regions where visual image fidelity is less important.

In many applications, preserving the orientation and quantization of the original image is less important than the maintaining of the visual information contained within the image. In particular, for images in the missing children library, if the identity of the child in the portrait can be ascertained with equal ease from either the original image or an image processed to aid in compression, then there is no loss in putting the processed image into the library. This principle can be applied to build the library of processed images by putting the original images into a standardized format. For missing children portraits, this might include orienting the head of each child to make the eyes horizontal centering the head relative to the image boundaries. Once constructed, these standardized images will be well compressed as the knowledge of their standardization adds image-to-image correlation.

Techniques from a compression method known as vector quantization (VQ) are useful in finding correlation between portions of an image. Compression by vector quantization VQ is well-suited for fixed-rate, lossy, high-ratio compression applications (see R. M. Gray, "Vector Quantization," IEEE ASSP Magazine, Vol. 1, April, 1984, pp. 4–29). This method breaks the image into small patches or "image blocks." These blocks are then matched against other image blocks in a predetermined set of image blocks, commonly known as the codebook. The matching algorithm is commonly the minimum-squared-error (MSE). Since the set of image blocks is predetermined, one of the entries of the set can be referenced by a simple index. As a result a multi-pixel block can be referenced by a single number. Using such a method the number of bits for an image can be budgeted. When a greater number of bits is allocated per image block, either the size of the codebook can be increased or the size of the block can be made smaller.

A need has therefore been felt for a technique and associated apparatus for improving the compression of data representing images and, particularly facial images. This technique would be particularly important in areas where limited storage space is available to represent a facial image, such as on a transaction card.

SUMMARY OF THE INVENTION

The present invention is directed to overcoming one or more of the problems set forth above. Briefly summarized, according to one aspect of the present invention, a technique is provided for enabling very high-compression ratios with minimal loss in image quality by taking advantage of standardized features in a library of images. This method of compression takes advantage of the built-in image-to-image correlation produced by the standardization to improve predictability and, therefore, improve compressibility. The invention has three components: a standardization procedure, a compression procedure and a decompression procedure. In the preferred embodiment, the technique takes advantage of the observation that, when standardized, selected portion of a facial image contain far greater amounts of information. By providing for more accurate reproduction of the facially important areas, a higher data compression can be achieved.

The disclosed technique provides a procedure for advantageously improving the compression of images. In the preferred embodiment involving facial images, a more accurate representation of a facial image can be provided for a storage medium with limited storage capacity, such as a transaction card.

DETAILED DESCRIPTION OF THE INVENTION

Figure 1A:
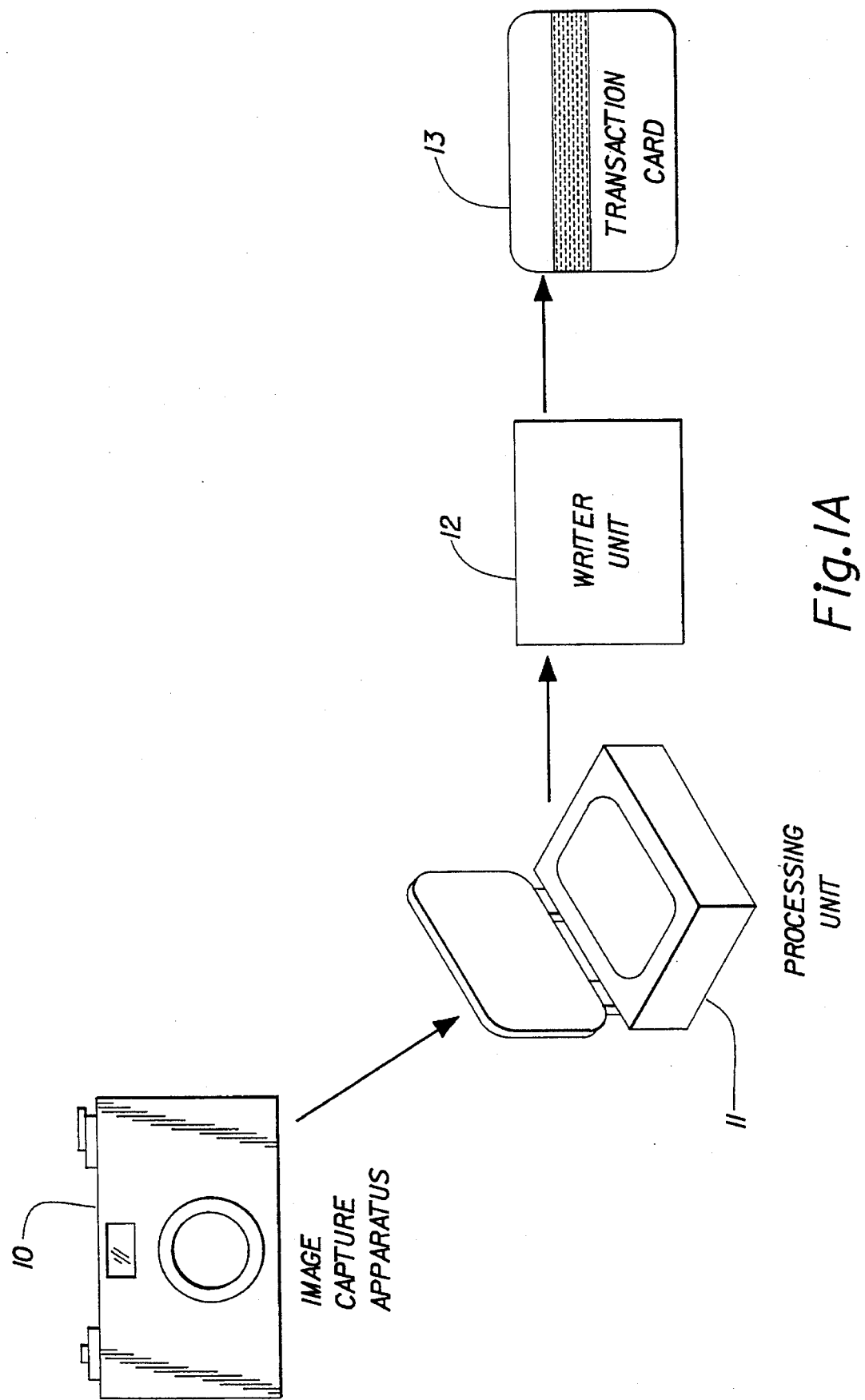
FIG. 1A is a block diagram of the apparatus for applying an encoded image on a transaction card, while FIG. 1B indicates the steps in applying an encoded image on a transaction card.

Referring to FIG. 1A, the apparatus for encoding image information on a magnetic stripe of a transaction card 13 is illustrated. An image is captured by an image capture apparatus 10 in a form capable of being stored and transformed into digital logic signals. The image can be captured, for example, on photographic film or can be stored as a set of analog electrical signals. In the example of a photographic film, the image capture apparatus 10 includes a film reader to provide a set of analog signals. The analog signals can be applied to an analog-to-digital converter. The digital signals from the image capture apparatus 10 are applied to a processing unit 11 wherein the image information is compressed. The resulting digital signals are applied to a writer 12 wherein the digital signals are encoded as electrical signals whereby the writer 12 generates a storage pattern on a storage material on the transaction card 13.

Figure 1B:
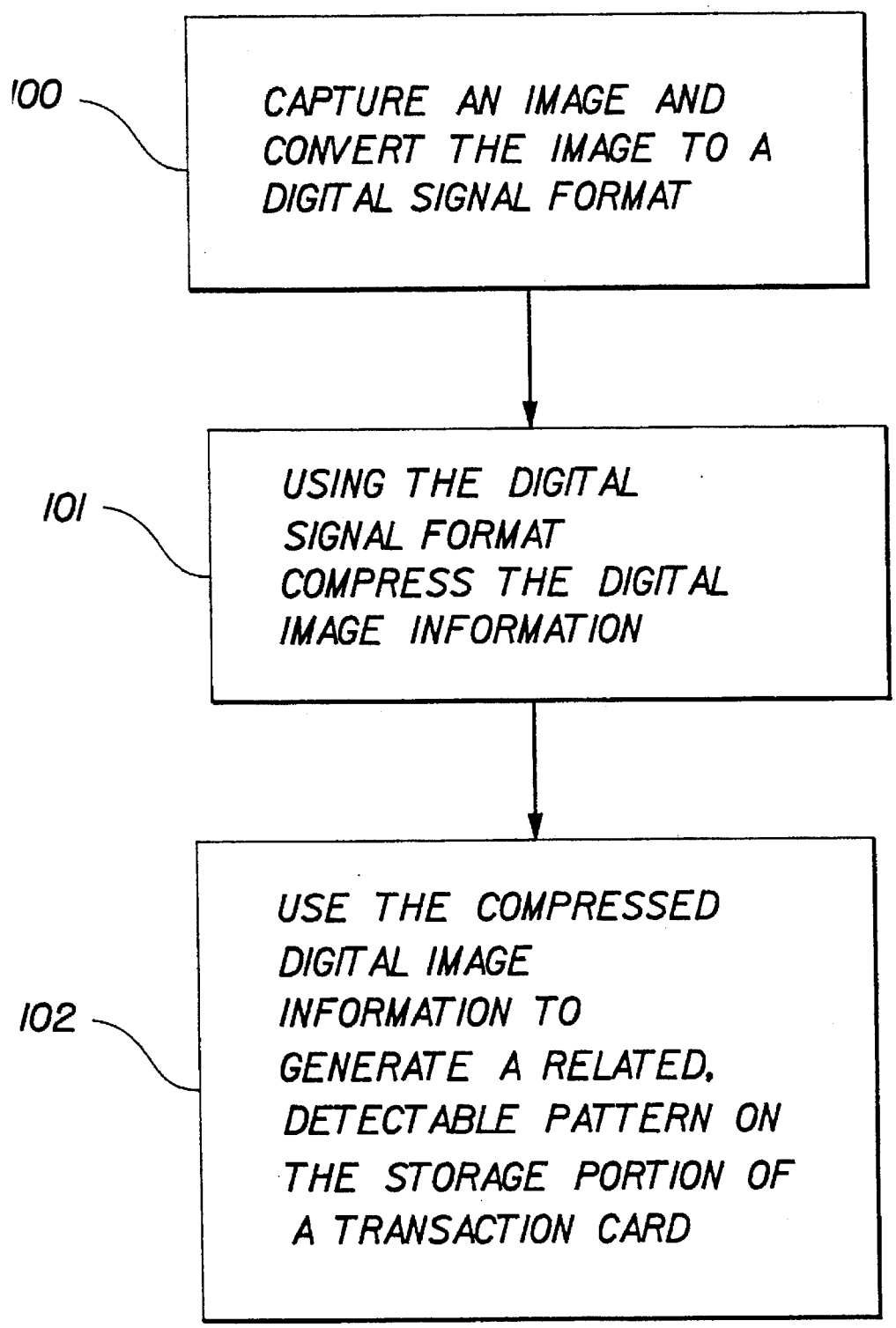

Referring to FIG. 1B, the process for storing encoded image information on a transaction card is shown. In step 100, an image is captured and is transformed into an ordered set of digital signals. The digital signals are then compressed in step 101. In step 102, the compressed digital signals are used to generate a recognizable pattern on a storage material associated with the transaction card.

Figure 2A:
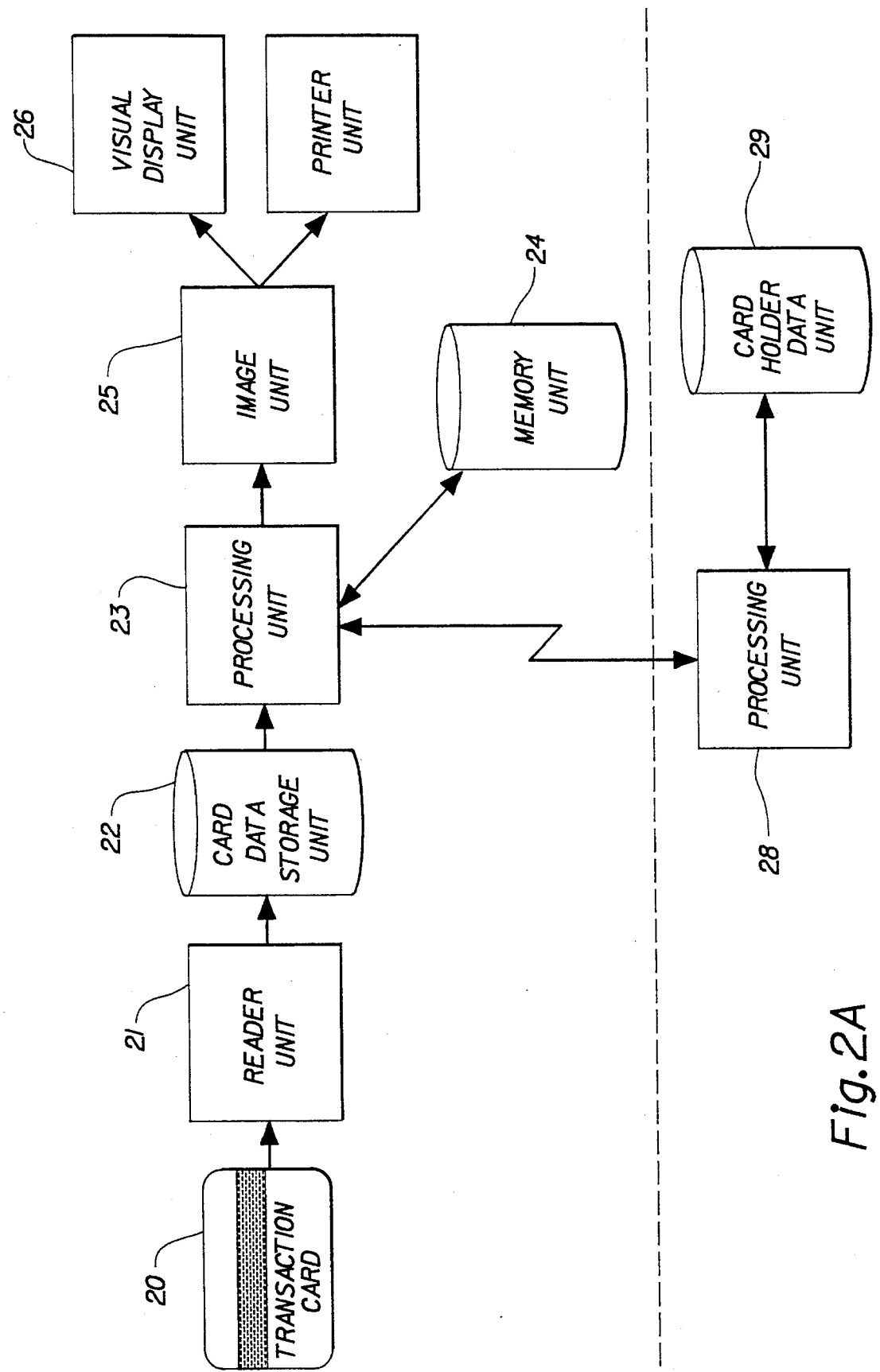
FIG. 2A is a block diagram of the apparatus for retrieving an encoded image from a transaction card, while FIG. 2B describes the steps in retrieving an encoded image from a transaction card.

Referring to FIG. 2A, the apparatus for retrieving encoded information from the storage portion of a transaction card 20 is shown. The reader 21 recognizes the patterns in the storage area of the transaction card 20 and converts the patterns to a set of digital signals. The digital signals retrieved from the transaction card are stored in card data storage unit 22. The data from the card data storage unit 22 is applied to the processing unit 23. In the processing unit 23, digital signals are restored (i.e., decompressed) using tables from algorithm table 24. The algorithm table 24 is typically a memory unit but can have a plurality of implementations. The digital signals of the restored image are applied to the image unit 25. The image unit 25 converts the signals comprising the restored image into signals appropriate for driving a visual display unit 26 or a printer unit 27.

In certain circumstances, the processor unit 23 can transfer data, (e.g., the compressed image digital signals) to a remote processing unit 28. In the remote processing unit 28, the images stored on the transaction card 20 can be compared with information stored in card data storage 29. This comparison can take place when the transaction at a remote location has a problem associated therewith.

Figure 2B:
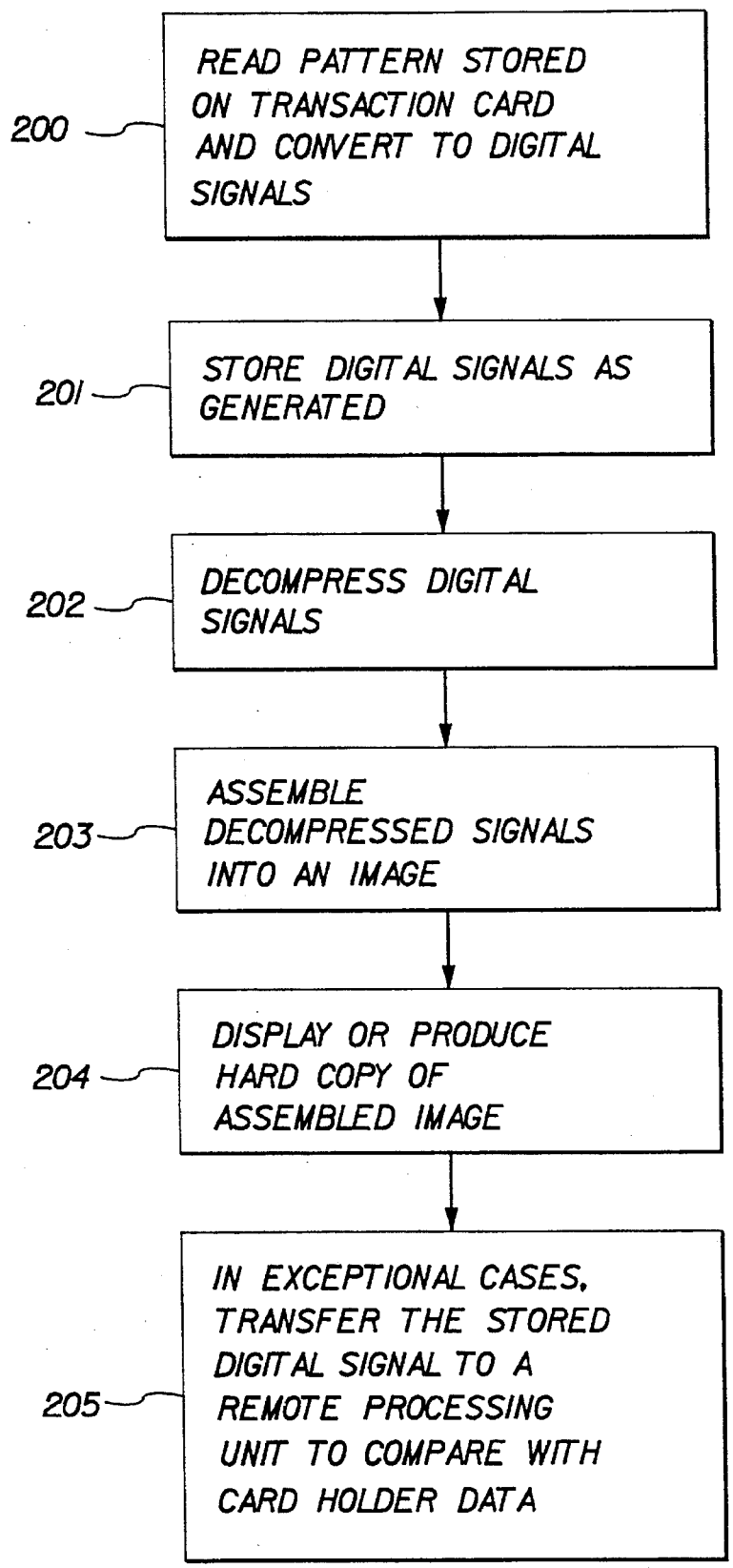
Figure 3:
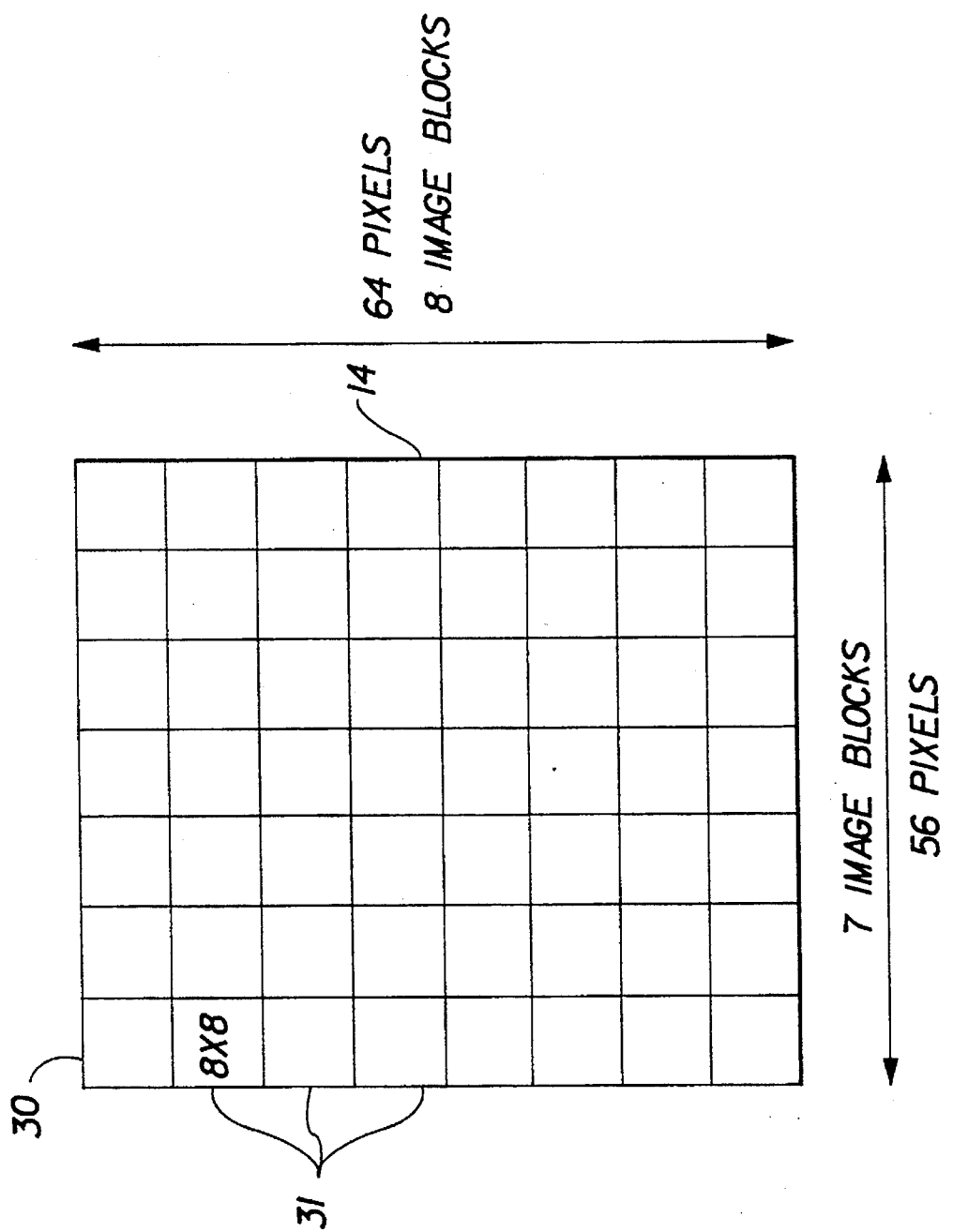
FIG. 3 illustrates the decomposition of an image pixel matrix into image pixel blocks.

Referring to FIG. 2B, the process by which an image is retrieved from a transaction card is shown. In step 200, a reader interacts with the transaction card and translates the pattern stored in the storage unit into digital signals. The digital signals are stored, in step 201, as the signals are identified by the reader. In step 202, the digital signals are restored, i.e., are decompressed. The decompressed digital signals are assembled into a "restored" image in step 203. In addition, step 203 can include additional processing such as artifact removal. In step 204, the signals representing a restored image are applied to the driver circuits of an image display unit or a printer and the restored image is provided for visual examination or comparison. In step 205, the image stored on the transaction card can be transferred to a remote location for comparison, verification, etc. with an archival copy of the image stored on the transaction card. The pixel matrix 30 is divided into image blocks 31 of 8 pixels by 8 pixels as illustrated in FIG. 3.

Figure 4:
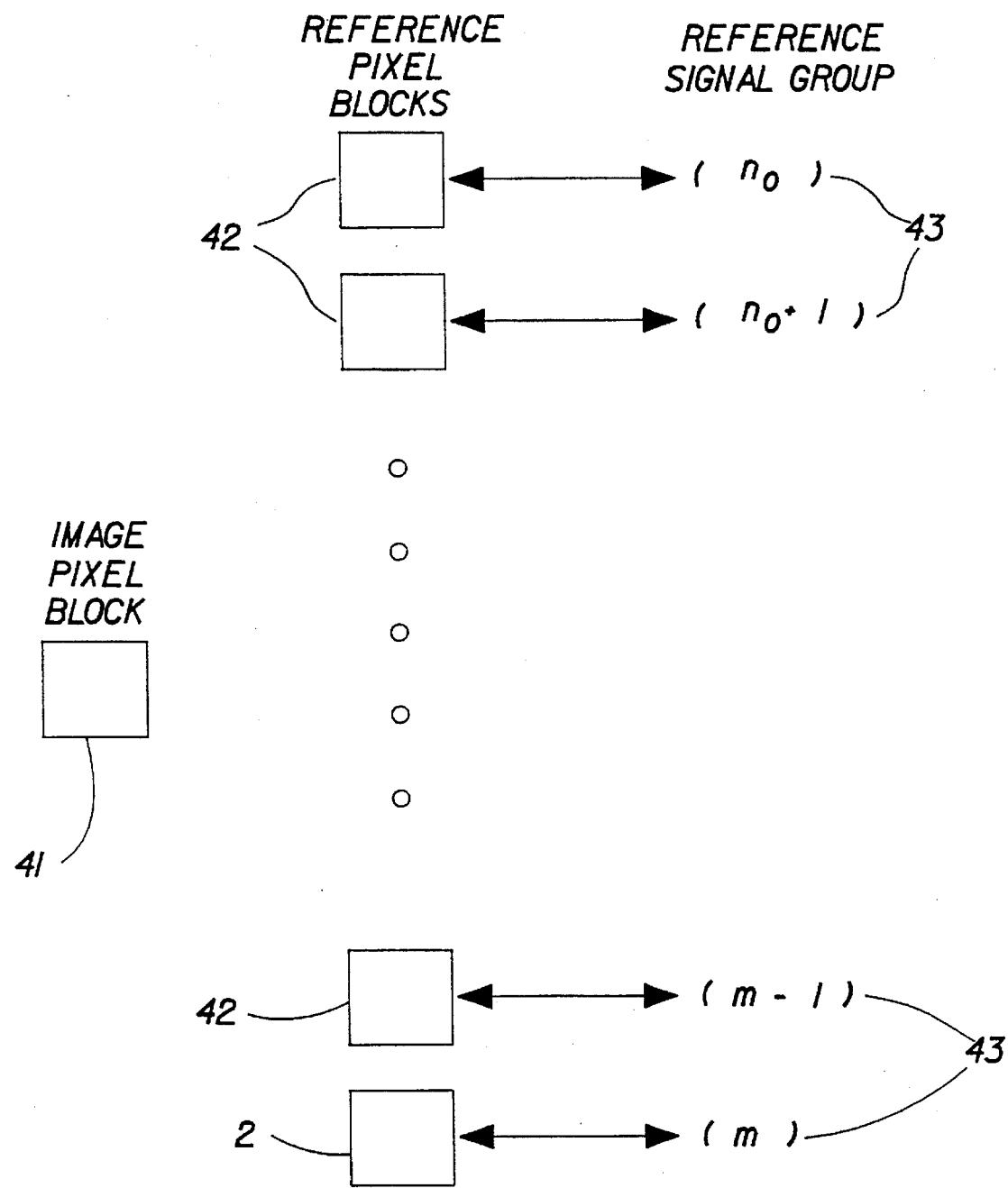
FIG. 4 illustrates the selection of reference signal group derived from an image pixel block.

Referring to FIG. 4, the image pixel block 41 has associated therewith a plurality of reference pixel blocks 42. Each reference pixel block has a reference signal group 43 associated therewith. The set of reference signal blocks 42 do not include all possible pixel combinations identified therein. Therefore, based on a predetermined criteria, the reference pixel block most closely associated with the image pixel block is selected and the identifying signal group 43 is used to identify the image at the location of the image pixel block. The set of signal groups resulting from the comparison of the image pixel block and the reference pixel block is a compressed representation of the image pixel matrix. This representation can be stored on the transaction card. In order to reconstruct the image, at the station reading the transaction card, the set of signal groups is identified and the associated reference pixel group placed in the position of the image pixel block generating the reference signal group.

Figure 5:
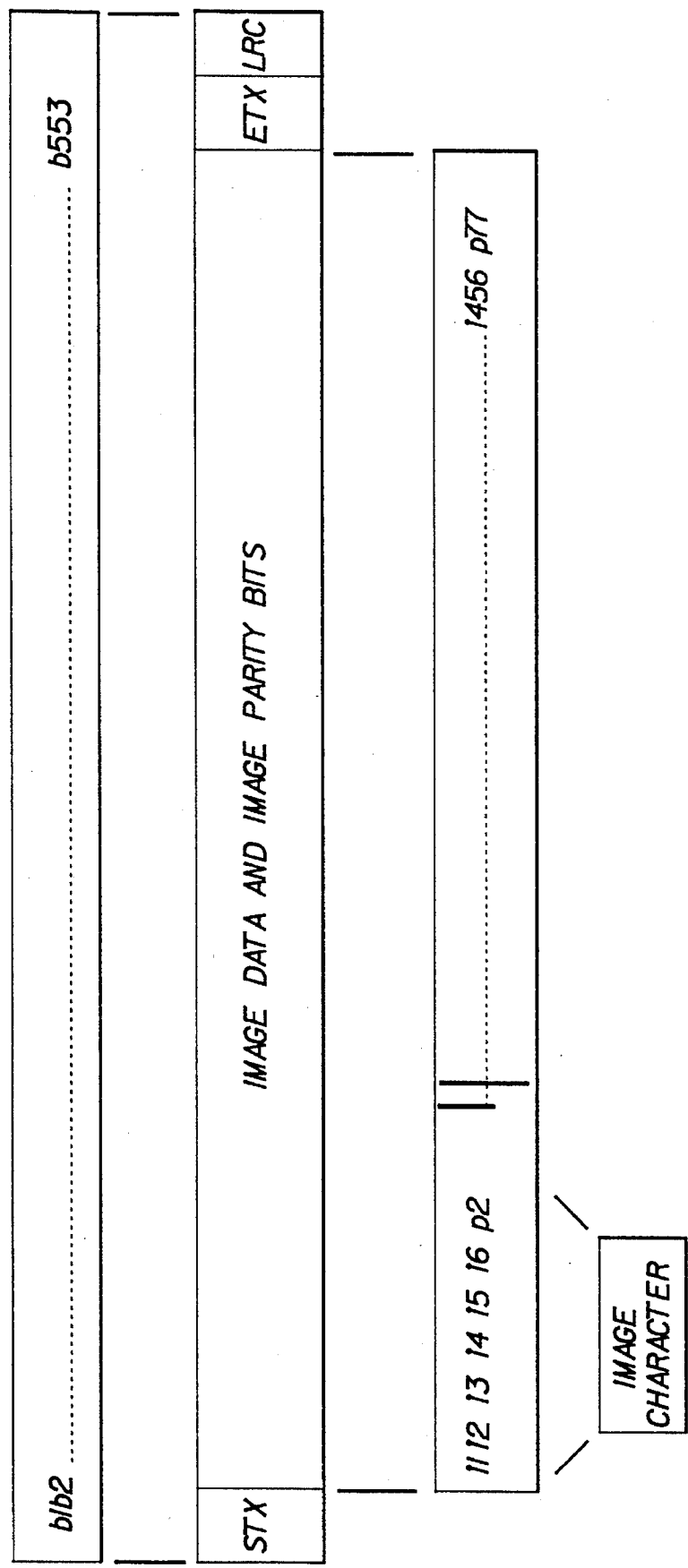
FIG. 5 illustrates the ISO Standard data format for magnetic stripe on a credit card.

Referring to FIG. 5, the data format of a transaction card is shown. ISO 7811 standards for magnetic encoding on credit cards requires 79 "characters" where each character is comprised of a seven-bit string. The data format has 553 raw data bits, the $i^{th}$ bit in the resulting string will be denoted by b(i). The first character or first 7 bits is a special character known as a start sentinel (STX) which denotes the start of the string of data bits. Bit b(8) through bit b(539) are known as the image and image parity bits. The image bits are denoted as $i_j$, j=1, ..., 456, and the parity bits are denoted by $P_k$, k=2 ..., 77. The image and parity bits are interleaved such that after every sixth image bit there is a parity bit.

The present invention achieves high-ratio, lossy compression and decompression of images from an image library. The process involves extracting the common features of images in the library and using this as a basis for image standardization. Once standardized into a standardized library image, the image can be compressed and subsequently decompressed into lossy representations of the original library image.

The first component of the present invention is the standardization mean which consists of the following processes:

select the image features of greatest importance;

process a set of representative images from the library to enhance the selected features;

locate selected features in the representative images;

determine constraints for locations of image features;

process the image to meet the image feature location constraints;

assign regions of the image based on presence of the features at a desired level of image quality;

determine the image-to-image correlation of the images for each subregion;

allocate capacity for storage of image information for each subregion based on a partition of the subregions into image blocks and codebook size; and construct codebooks to take advantage of the correlation.

This establishes both the processing method used in standardizing images, the partitioning of images into subregions, as well as the codebooks used for each subregion. This provides sufficient information for images in the library to be compressed.

The procedure for compressing an image is as follows:

process the image to enhance features;

locate selected features in the image;

standardize the image by processing the image to meet the image feature location constraints;

partition the image based on the subregions and their image blocks;

for each region, determine the entry in the codebook which best approximates the image content; and store the series of codebook values for each image block as the compressed image.

The compressed image can then be decompressed into a new image. The compressed/decompressed image will not in general match the original image as the compression/decompression cycle is lossy.

Decompression proceeds as follows:

extract the codebook values from the series of codebook values;

determine the codebook based on which subregion this position in the codebook value series corresponds to;

extract an image block based on the codebook value from the above determined codebook;

copy the image block into the appropriate image block location in the subregion; and continue inserting image blocks until all image block locations are filled in the entire image.

Images are processed to aid in the selection and identification of features. One form of common process would be to enhance the contrast in the image. Histogram equalization or linear rescaling are examples of methods for enhancing contrast (see J. C. Russ, "Image Processing Handbook," CRC Press, Boca Raton, 1992). In addition, image processing methods could be applied to specific subregions of the image. For example, in the library of missing children portraits a variety of image processing techniques could be applied by region, such as edge sharpening filters to enhance hair, histogram equalization to improve contrast in the facial region, smoothers in the shoulder region. Also, image processing along the boundaries between these subregions would reduce any visual artifacts introduced by the processing within a subregion.

A desired subimage can be created with the eyes of the person depicted in the portrait image centered on predetermined pixels. In order to accomplish this image standardization, the eyes are found in the original image either manually or via an automated feature extraction method. Given the pixel coordinates in the original image, a transformation to the standardized image format can be found. (This would involve a combination of a translation, zoom, and rotation of the original image.)

Different regions of the image may be desired to be rendered at different quality levels. This has an impact on how the bits are allocated to the different subregions of the image. Codebook sizes can be made larger to improve quality.

The method of training and designing the compressor for a library of standardized images can include the following steps:

Training over standardized images in the library to select a set of image blocks to be used in the compression process where the image blocks are from a subregion of the standardized images.

Determining the desired level of quality and the variance in image blocks for a subregion of the standardized images.

Setting a codebook size for each subregion.

Selecting image blocks for each codebook.

Forming a multiplicity of codebooks of image blocks where each codebook corresponds to a different subregion of the standardized image.

The process can also include a step of identifying subregions of the standardized image which can use the same codebook, but access it in a different manner. Examples of this include:

Symmetry. Suppose two image subregions are almost reflections of each other. One subregion could use a codebook as it was stored, but the other would use the reflection of each image block.

Subcodebook. Storing detail in a given subregion may be more important than in another subregion, but the subregions have similar image content. The subregions could use the same codebook, but the subregion needing less detail may only access a subset of the codebook, say the first half.

Codebooks are determined by forming a collection of a number of representative images, known as the training set. Images are partitioned into image blocks. The image blocks are then considered as vectors in a high-dimensional vector space, e.g., for an 8×8 image block, the space has 64 dimensions. In the preferred embodiment the image blocks are selected from predetermined regions within the image. Once all the vectors are determined from the training set clusters are determined and representative elements are assigned to each cluster. The clusters are determined in such a manner to minimize the overall combined distances between a member of the training set and the representative for the cluster the member is assigned. A standard method of accomplishing this is the Linde-Buzo-Gray (LBG) algorithm (see Y. Linde, et al., "An Algorithm for Vector Quantizer Design," IEEE Transactions on Communications, Vol. COM-28, No. 1, January, 1980, pp. 84–95). The number of clusters is determined by the number of bits budgeted for a block. If n bits are budgeted, then the codebook can contain up to $2^n$ cluster representatives or code vectors.

Figure 6:
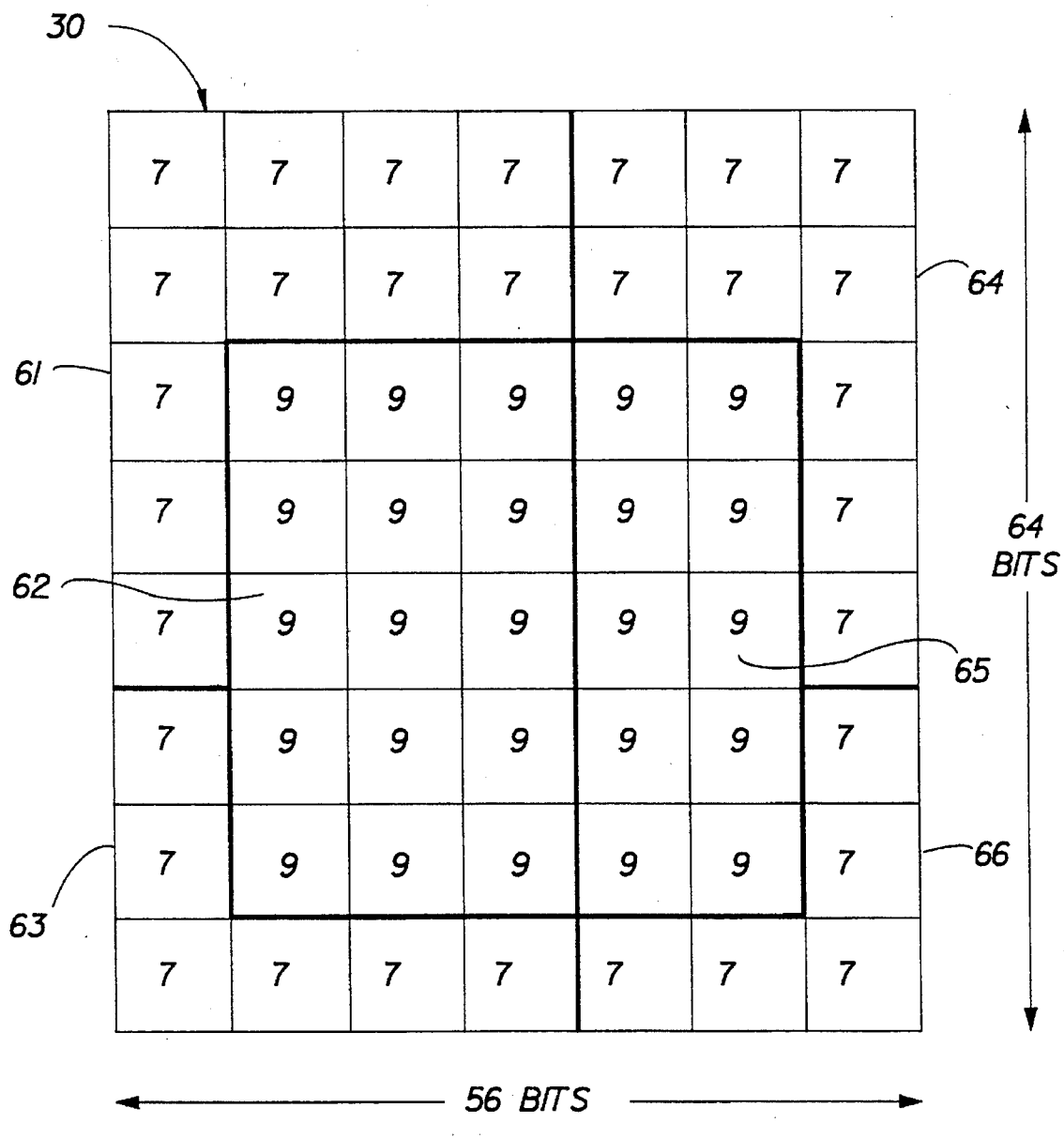
FIG. 6 illustrates characteristics which can be used to facilitate data compression in libraries of facial images.

Referring to FIG. 6, a more efficient technique for using this compression technique with the image 30 is illustrated. This technique makes use of the fact that when the image is a face, certain parts of the image contain more information that other parts. In FIG. 6, six regions are identified. These region are identified as follows: hair left, 61; face left, 62, shoulder left, 63; hair right, 64; face right 65; and shoulder right 66. Because most of the information permitting identification of a face is in regions 62 and 65, these regions have more reference pixel blocks associated therewith and consequently these regions, for the example shown, are identified by 9 logic signals. In regions 61, 63, 64, and 66, less information is present and these regions can be identified by a set of reference pixel blocks with only seven logic signals associated therewith. That is, the number of pixels used in identifying the face portion of the image is $2^2$ times the number of reference pixel blocks used to identify the outer regions of the portrait.

Image blocks are classified based on their location as being within the class of hair, shoulders or facial. The collection of blocks associated with a class is called an image region. Assignments of image regions to general classes is displayed in FIG. 6, as well as the number of bits for each codebook. All blocks within a region will share the same codebook, although some blocks may access the codebook in different ways by either using a subset of the codebook blocks or further processing the codebook image blocks before mapping them into the image.

In the present invention there are multiple codebooks which depend upon the location of the block within the image. The number of code values per codebook is also variable, depending upon the relative value of the image block. In the preferred embodiment there is sufficient symmetry between blocks of a given region type that all the training vectors are assumed to come from what is referred to as left-sided blocks, see FIG. 6, and the right-sided blocks are recovered by reflection.

Unlike most images, location of pixels in the image and its relative value to the application is known. For example, pixel locations can be clustered into image regions based on their anticipated contents and their predetermined importance in the identification of individuals from portraits. The greater the contribution of a region to identification, the more bits it will be allocated to encode those regions. Special codebooks can be developed for each region as well. Since a particular region may have unique features this specialization yields significant improvements in image quality.

The notion of codebook specialization can be built in a hierarchical basis in that total images may be first directed to use a particular set of codebooks, and the codebooks within that set are applied on an spatial basis. For instance, specific sets of codebooks can be developed based upon the gender, ethnic or age of the subject. Codebooks can be developed on the basis of a training set consisting solely of female subjects. The result is a that the images will reconstruct feminine features with better clarity than a codebook developed from a training set of all subjects. This information is coded as overhead bits and included in the overall bit-budget scheme.

The present invention has several advantages. The technique allows for high-quality lossy compression at high compression ratios. Various regions of the image can have their image quality adjusted independently. Because of the high compression ratio, the individual images of the library can have a low transmission time and require little storage capacity. The decompression of the transmitted/stored image can be rapid because of restoration is based on look-up tables.

While the invention has been described with reference to improving the compression of facial images, it will be apparent that the invention is easily adapted to other images which can be standardized to include portions which consistently have either a relatively high density of information or a relatively low density of information compared to the remainder of the image.

As will be clear to those skilled art, techniques other than vector quantization can be used to compress and decompress the image data without departing from the invention. For example, differential pulse code modulation can be used in the compression/decompression procedures.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

Parts List

10 Image capture apparatus
11 Processing unit
12 Writer unit
13 Transaction card
20 Transaction card
21 Reader unit
22 Card data storage unit
23 Processing unit
24 Storage unit
25 Image unit
26 Visual display unit
27 Printer unit
28 Processing unit
29 Card holder storage unit
30 Pixel image matrix
31 Image pixel block
41 Image pixel block
42 Reference pixel block
43 Reference signal group
61 (Image) hair left
62 (Image) face left
63 (Image) shoulder left
64 (Image) hair right
65 (Image) face right
66 (Image) shoulder right

What is claimed is:

1. A method of increasing the compression ratio for a library of facial images, the method comprising the steps of:
    standardizing spatial features and characteristics, including the steps of:
        selecting image features in an order of importance, and
        positioning eyes and facial orientation in each image in a standard locational configuration,
    identifying regions of increased informational significance of the images;
    compressing each image; and providing an increased data density in each compressed image responsive to the standardizing and identifying including the step of providing compressed data in a region of a face having a higher compression ratio than non-facial regions.

2. A method of increasing the compression ratio for a library of facial images, the method comprising the steps of:

automatically standardizing spatial features and characteristics and identifying regions of increased informational significance of the images; and automatically compressing each image and providing an increased data density in each compressed image responsive to the standardizing and identifying;

wherein said standardizing step includes the steps of:
selecting image features in an order of importance;
providing set of images from said library which enhances the selected features;
determining image feature constraints for said selected features;
automatically processing said image to meet said image feature constraints, wherein said image feature constraints comprising compression and image quality requirements; and
positioning eyes and facial orientation in each image in a standard locational configuration; and wherein said providing step includes the step of:
providing compressed data in a region of a face having a higher compression ratio than non-facial regions.

3. A method for providing a higher compression ratio for each image in a library of images, said method comprising the steps of:

automatically spatially standardizing the images forming said image library to provide spatial correlations between features of the standardized images;

automatically compressing said standardized images using the spatial correlations between said standardized images; and automatically decompressing said compressed standardized image to provide a visual image;

wherein said standardizing step includes the steps of:
identifying image features in an order of importance;
processing images to enhance said image features;
identifying constraints of said image features;
processing said image to meet the constraints; and
automatically assigning image regions based on a presence of a desired image quality and a desired image compression;.

wherein said processing images step includes the steps of:
processing said images using vector quantization; and
providing a plurality of codebooks, each codebook comprising representative images corresponding to said vector quantization, wherein each image region has a selected codebook for processing each image region; and wherein said decompressing step further include the step of decompressing each image region using said selected codebook which used in said compressing step.

4. The method of claim 3 wherein said images are facial images, said standardizing step including a step of positioning eyes and orienting facial features in a predetermined manner for each image.

5. The method of claim 4, wherein said compressing step includes the step of varying a number of codebook representative images as a function of spatial position.

6. The method of claim 5, wherein said compressing step includes the step of providing reduced number of codebook representative images in the peripheral region of said image.

7. A method of automatically compressing images, comprising:

standardizing the spatial location of features in the images;

assigning an image quality level to regions comprising the spatial location of the features in the images;

determining image-to-image correlations between the regions of the images and reflection transforming the images;

allocating a storage capacity for each region of the images;

constructing a codebook for each region of the images;

partitioning each image into the regions;

determining an entry in each codebook closest to a content of each region; and storing the entry as a compressed image.

* * * * *